(12) United States Patent
Hirashige et al.

(10) Patent No.: US 7,955,757 B2
(45) Date of Patent: Jun. 7, 2011

(54) CATALYST FOR FUEL CELL, MEMBRANE-ELECTRODE ASSEMBLY, METHOD OF MANUFACTURING THE ASSEMBLY, AND FUEL CELL USING THE ASSEMBLY

(75) Inventors: Takayuki Hirashige, Hitachi (JP); Hiroshi Sasaki, Mito (JP); Makoto Morishima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 11/845,161

(22) Filed: Aug. 27, 2007

(65) Prior Publication Data

US 2008/0044697 A1 Feb. 21, 2008

Related U.S. Application Data

(63) Continuation of application No. 11/196,284, filed on Aug. 4, 2005, now abandoned.

(30) Foreign Application Priority Data

Aug. 5, 2004 (JP) .................................. 2004-229124

(51) Int. Cl.
*H01M 8/10* (2006.01)

(52) U.S. Cl. ......... 429/530; 429/482; 429/483; 429/523

(58) Field of Classification Search ........................ None
See application file for complete search history.

(56) References Cited

U.S. PATENT DOCUMENTS

| | | | |
|---|---|---|---|
| 6,660,424 B1 * | 12/2003 | Gyoten et al. | 429/38 |
| 6,663,994 B1 | 12/2003 | Fly et al. | |
| 6,740,445 B1 | 5/2004 | Grot | |

FOREIGN PATENT DOCUMENTS

| | | |
|---|---|---|
| EP | 1 117 142 A1 | 7/2001 |
| JP | 3245929 | 11/2001 |
| JP | 2003-10960 | 1/2003 |
| JP | 2003-208905 | 7/2003 |
| JP | 2004-203712 | 7/2004 |
| JP | 2004-214004 | 7/2004 |
| WO | WO 00/11741 | 3/2000 |

* cited by examiner

*Primary Examiner* — Cynthia Lee
(74) *Attorney, Agent, or Firm* — Antonelli, Terry, Stout & Kraus, LLP.

(57) ABSTRACT

A membrane-electrode assembly comprising a cathode catalyst layer for reducing an oxidant gas, a polymer electrolyte membrane and an anode catalyst layer, the polymer electrolyte membrane being sandwiched between the catalyst layers, wherein the cathode catalyst layer exhibits super-water-repellency. The disclosure is also concerned with a method of manufacturing the membrane-electrode assembly and a fuel cell using the membrane-electrode assembly.

5 Claims, 4 Drawing Sheets

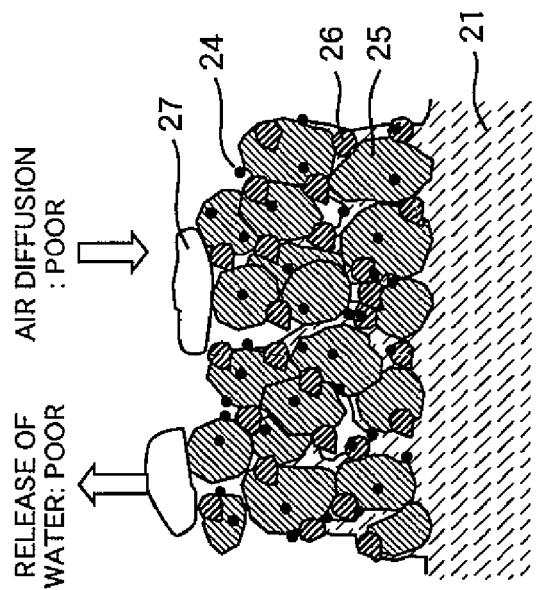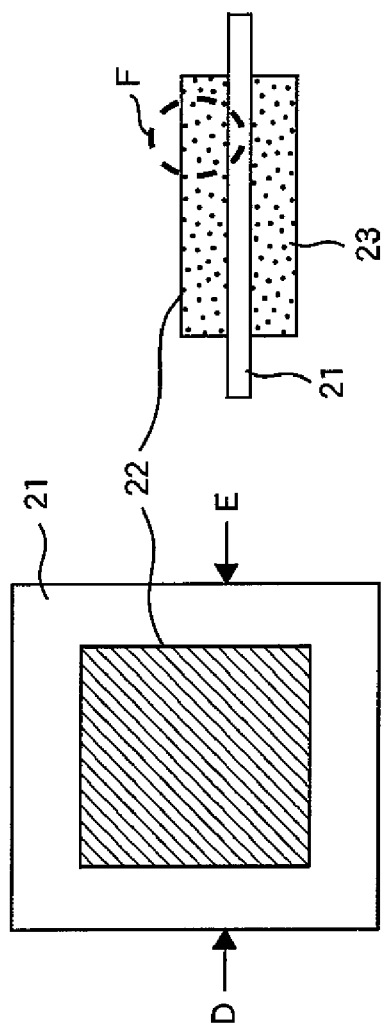

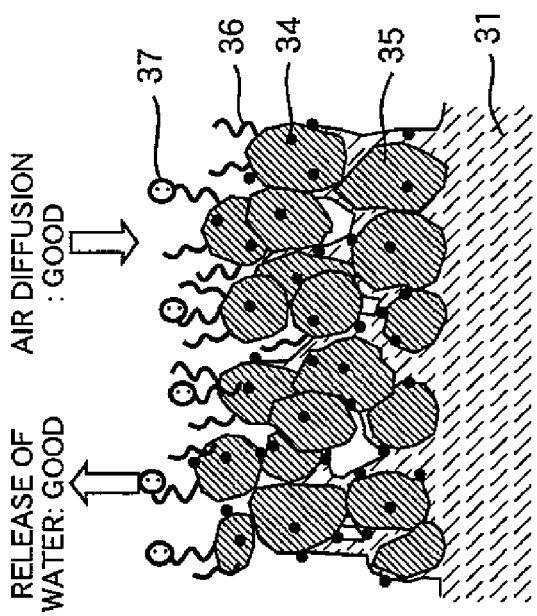
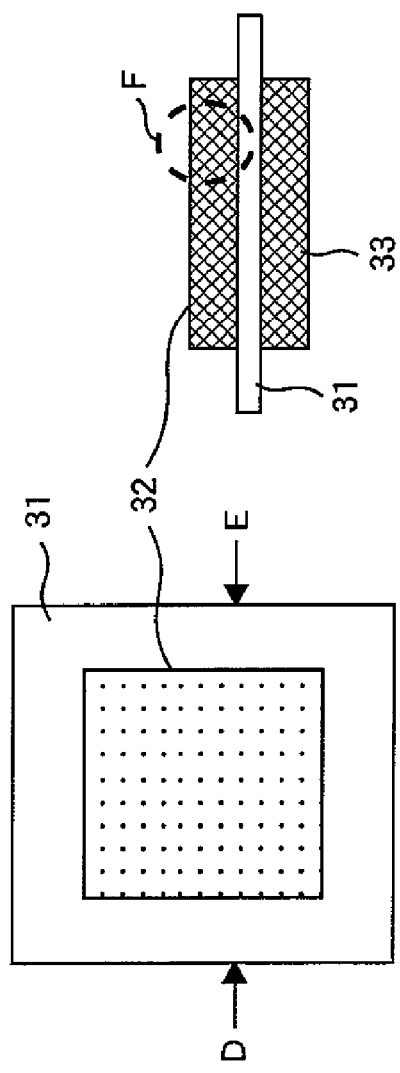
FIG. 3a
FIG. 3b
FIG. 3c

CATALYST FOR FUEL CELL, MEMBRANE-ELECTRODE ASSEMBLY, METHOD OF MANUFACTURING THE ASSEMBLY, AND FUEL CELL USING THE ASSEMBLY

CROSS-REFERENCE TO RELATED APPLICATION

This application is a continuation application of U.S. application Ser. No. 11/196,284, filed Aug. 4, 2005 now abandoned, the contents of which are incorporated herein by reference.

CLAIM OF PRIORITY

This application claims priority from Japanese Application serial No. 2004-229124, filed on Aug. 5, 2004, the content of which is incorporated by reference into this application.

FIELD OF THE INVENTION

The present invention relates to a catalyst for a fuel cell, a membrane-electrode assembly (hereinafter referred to as MEA) using the catalyst, a method of manufacturing the assembly and a fuel cell, and more particularly to a fuel cell with a remarkably increased releasing property of reaction water, the MEA for the fuel cell and a method of manufacturing the MEA.

RELATED ART

A fuel cell is an apparatus for directly converting chemical energy to electric energy. That is, a fuel such as hydrogen, methanol, etc and an oxidant gas such as air are subjected to electro-chemical oxidation-reduction thereby to take out electricity. The fuel cells are classified by kinds of electrolytes and operating temperature into polymer type, phosphoric type, molten salt type, solid electrolyte type, etc.

Among them, a PEFC (Polymer electrolyte Fuel cell) that uses a polymer electrolyte of perfluorocarbon sulufonate resin oxidizes hydrogen at an anode and reduces oxygen at a cathode. A DMFC (Direct methanol fuel cell) that uses methanol as a fuel instead of hydrogen is being focused recently.

An electrode structure of these fuel cells is constituted by an anode catalyst layer, a cathode catalyst layer, a proton conductive solid polymer electrolyte sandwiched between the anode and the cathode, and gas diffusion layers, for supplying reactants and collecting electricity, placed outside of the anode and the cathode.

The anode catalyst layer and the cathode catalyst layer are made of matrices each comprising a mixture of catalyst carrying carbon and solid polymer electrolyte. Electrode reactions take place at the three phase interface where the catalyst on carbon, electrolyte and reactants are in contact. The continuation of carbon particles is a path for electrons and the continuation of the electrolyte a path for protons.

As the electrode reactions, in the case of PEFC where hydrogen is fuel and air is oxidant, the following reactions take place at the anode catalyst layer and the cathode catalyst layer thereby to take out electricity.

$$H_2 \rightarrow 2H^+ + 2e^- \quad (1)$$

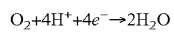

$$O_2 + 4H^+ + 4e^- \rightarrow 2H_2O \quad (2)$$

In the case of DMFC, which uses methanol aqueous solution as a fuel, the reaction (3) takes place at the anode. In the specification, water produced by the cell reaction (2) is called "reaction water".

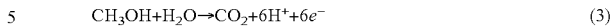

$$CH_3OH + H_2O \rightarrow CO_2 + 6H^+ + 6e^- \quad (3)$$

In any case of PEFC and DMFC, reaction water is produced at the cathode. In the specification, water produced by the fuel cell reaction is defined as reaction water. The larger an electric current density, the larger an amount of the reaction water is produced. In particular, when the fuel cell is operated at a high current density, the reaction water may stay on the surface and in the pores of the cathode catalyst layer, which is called a flooding phenomenon. As a result, the diffusion paths for gas reaction are closed to lower drastically an output of the fuel cell.

In order to prevent the flooding phenomenon, water repellent particles such as polytetrafluoroethylene (PTFE) are dispersed in the cathode catalyst layer so as to impart water repellency for releasing water to the cathode catalyst layer, in general.

For the purpose of releasing of reaction water, patent document No. 1 discloses a concentration gradient of water repellency in the cathode catalyst layer. In considering that the flooding phenomenon tends to take place at positions, which are close to the interface between the cathode catalyst layer and the electrolyte membrane, the portions of the catalyst layer which is close to the electrolyte membrane have higher water repellency thereby to increase water releasing property. Further, patent document No. 2 discloses as a water repellent agent tetrafluoride ethylene-pentafluoride propylene copolymer.

However, a contact angle with water of these water repellent agents is about 100 degrees. When the water repellent agents are mixed in the cathode catalyst layer, the cathode catalyst layer becomes hard to be wetted with water so that the surface area of the reaction water becomes large to vaporize it. However, there is a limitation or releasing water by the evaporation. Further, since the operation of DMFC is conducted at around room temperature, an amount of water evaporation is small so that the water releasing property is low.

Patent document No. 1: Japanese patent No. 3245929
Patent document No. 2: Japanese patent laid-open 2003-10960

SUMMARY OF THE INVENTION

In view of the above-mentioned problems, the present invention aims at providing an MEA for a fuel cell, a method of manufacturing the MEA and a fuel cell using the assembly, wherein the cathode catalyst layer is given a better water repellency than that of the conventional cathode catalyst layer. The fuel cell according to the present invention can prevent the flooding phenomenon even at a higher current density operation.

The present invention provides an MEA comprising a cathode catalyst layer for reducing an oxidant gas, an anode catalyst layer for oxidizing a fuel gas and a solid polymer electrolyte membrane of proton conductivity, sandwiched between the anode and the cathode, wherein the cathode catalyst layer exhibits super-water-repellency.

The present invention imparts the better water repellency to the cathode catalyst layer thereby to provides the MEA that prevents flooding.

BRIEF DESCRIPTION OF THE DRAWINGS

FIG. 2 explains the structure and function of the conventional MEA.

FIG. 3 explains the structure and function of the MEA according to one embodiment of the present invention.

EXPLANATIONS OF THE REFERENCE NUMERALS

11; separator, 12; solid polymer electrolyte membrane, 13; anode catalyst layer, 14; cathode catalyst layer, 15; gas diffusion layer, 16; gasket, 21; solid polymer electrolyte membrane, 22; cathode catalyst layer, 23; anode catalyst layer, 24; catalyst metal, 25; carbon carrier, 26; water repellent particle, 27; reaction water, 31; solid polymer electrolyte membrane, 32; cathode catalyst layer, 33; anode catalyst layer, 34; catalyst metal, 35; carbon carrier, 36; silicon compound, 37; reaction water

DETAILED DESCRIPTION OF THE PREFERRED EMBODIMENTS

The MEA of typical embodiments of the present invention is characterized in that the cathode catalyst layer contains at least one of silicon compounds selected from the group consisting of silicon compounds having a perfluoropolyether chain, perfluoroalkyl chain or fluoroalkyl chain in the molecule. The silicon compounds may be represented by the formulae (1). One or more of the silicon compounds effect condensation reaction so that the reaction product is contained in the cathode catalyst layer.

Formulae (1) Include:

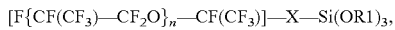

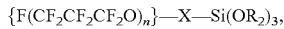

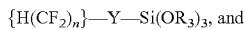

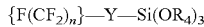

In the above formula (I), X is a connecting group between a perfluoropolyether chain and an alkoxysilane residue, Y is a connecting group between a perfluoroalkyl chain and an alkoxysilane residue, and $R_1$, $R_2$, $R_3$ and $R_4$ are alkyl groups.

Since the compounds exhibit better water repellency than that of the conventional water repellent agents, a better water repellency is given the cathode catalyst layer. Further, it is possible to impart super-water-repellency to the cathode catalyst layer. When the super-water-repellency is given the cathode catalyst layer, the reaction water never adheres to the cathode catalyst layer so that the flooding phenomenon can be prevented completely and an output of the fuel cell can be increased.

In the specification, the words "super-water-repellency" are used to mean that a water repellent surface has such a property that water does not adhere to the surface to be tested by a contact angle meter. In concrete examples, the inventors' tests show that the contact angle with water of the surface is 157 degrees or more, which is called the super-water-repellency. Accordingly, the super-water-repellency in the present invention is used to means a contact angle of 150 degrees or more.

Figure 1:
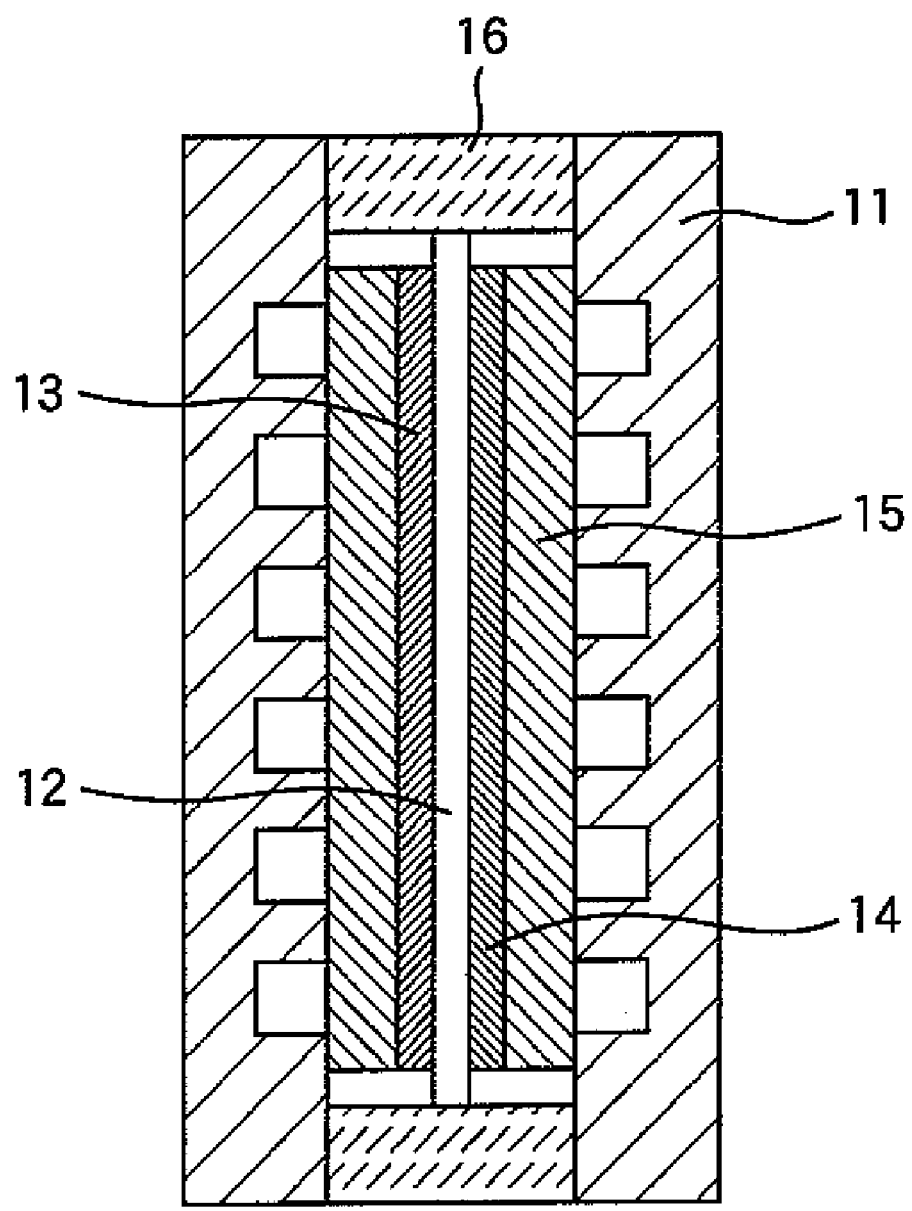
FIG. 1 is a cross sectional view of a unit cell of an embodiment according to the fuel cell of the present invention.

The preferred embodiments of the present invention will be explained by reference to the drawings. FIG. 1 shows an example of a unit cell according to the present invention. In FIG. 1, 11 denotes a separator, 12 a solid polymer electrolyte membrane, 13 an anode catalyst layer, 14 a cathode catalyst layer, 15 a gas diffusion layer, and 16 a solid polymer electrolyte membrane. The anode catalyst layer 13 and the cathode catalyst layer 14 are bonded to the solid polymer membrane 12 to be united, which is called a MEA.

The separator 11 is electro-conductive, and its material is dense graphite plate, carbon plates made of a molded mixture of a resin and graphite powder or carbon black powder, metallic plate of anti-corrosion such as stainless steel, titanium, etc. The surface of the separator may be plated with noble metal or is coated with an anti-corrosive, heat resistant paint.

Surfaces of the separator 11 that are in contact with the anode catalyst layer 13 and the cathode catalyst layer 14 are provided with grooves, whereby the anode side is supplied with fuel and the cathode side is supplied with oxydant. When the fuel is hydrogen and air is the oxydant, the following reactions take place at the anode and the cathode to take out electricity.

  (1)

  (2)

In the case of DMFC, which uses methanol aqueous solution as a fuel, the reaction (3) takes place at the anode to take out electricity.

  (3)

Protons generated in the equation (1) or (3) at the anode move through the solid polymer membrane 12 to the cathode 14.

The diffusion layer 15 is preferably made of carbon cloth or carbon paper. The gasket 16 is electrically insulative. The material for the gasket should be less permeability to hydrogen gas or methanol aqueous solution and keeps the fuel cell gastight or liquidtight. Examples of the materials are butyl rubber, viton rubber, EPDM rubber, etc.

Problems of the conventional MEAs are explained in the following. In FIG. 2, (a) shows a plan view of MEA, (b) a cross sectional view and (c) an enlarged view of the portion F in (b). 21 Denotes a solid polymer electrolyte membrane, 22 a cathode catalyst layer, 23 an anode catalyst layer, 24 catalyst metal, 25 carbon carrier and 26 water repellent particle. A typical water repellent material in the conventional MEA was PTFE, which has a contact angle with water of 108 degrees.

Adding of PTFE makes the cathode catalyst layer hard to be wetted with water to enlarge the surface area of water thereby to evaporate reaction water. However, there was a limit of an amount of evaporation. Since DMFC is operated at around room temperature, an amount of evaporated reaction water is small and release of the reaction water is low. Accordingly, as shown in FIG. 2 (c), the reaction water stays in the surface of the cathode catalyst layer 22 to close paths for air diffusion thereby to lower the output.

FIG. 3 shows a diagrammatic view of the MEA of the present invention. In FIG. 3, (a) is a plan view of MEA, (b) a cross sectional view, and (c) an enlarged view of the portion F in (b). As shown in FIG. 3 (c), there is at least one of the silicon compound having perfluoropolyether chain, perfluoroalkyl chain or fluoroalkyl chain.

Since these compounds exhibit strong water repellency, the contact angle of the surface of the cathode catalyst layer with water becomes large. Further, it is possible to impart super-water-repellency to the cathode catalyst layer so that the reaction water becomes water drops. In such case, the reaction water never adheres to the cathode catalyst layer, and scatter from the cathode. As a result, the reaction water never stays in the surface of the cathode catalyst.

According to the present invention, releasing property of the reaction water is excellent. Particularly, it is possible to prevent flooding phenomenon in the high current density operation to increase an output of the fuel cell.

Examples of the silicon compounds represented by the formulae (1) include at least one of compounds 1 to 12 shown below:

F{CF(CF$_3$)—CF$_2$O}$_n$—CF(CF$_3$)—CONH—(CH$_2$)$_3$—Si(OCH$_2$CH$_3$)$_3$     (Compound 1)

F{CF(CF$_3$)—CF$_2$O}$_n$—CF(CF$_3$)—CONH—(CH$_2$)$_3$—Si(OCH$_3$)$_3$     (Compound 2)

F(CF$_2$CF$_2$CF$_2$O)$_n$—CF$_2$CF$_2$—CONH—(CH$_2$)$_3$—Si(OCH$_2$CH$_3$)$_3$     (Compound 3)

F(CF$_2$CF$_2$CF$_2$O)$_n$—CF$_2$CF$_2$—CONH—(CH$_2$)$_3$—Si(OCH$_3$)$_3$     (Compound 4)

H(CF$_2$)$_6$—CONH—(CH$_2$)$_3$—Si(OCH$_2$CH$_3$)$_3$     (Compound 5)

H(CF$_2$)$_6$—CONH—(CH$_2$)$_3$—Si(OCH$_3$)$_3$     (Compound 6)

H(CF$_2$)$_6$—CONH—(CH$_2$)$_3$—Si(OCH$_2$CH$_3$)$_3$     (Compound 7)

H(CF$_2$)$_8$—CONH—(CH$_2$)$_3$—Si(OCH$_3$)$_3$     (Compound 8)

F(CF$_2$)$_6$—CH$_2$CH$_2$—Si(OCH$_3$)$_3$     (Compound 9)

F(CF$_2$)$_8$—CH$_2$CH$_2$—Si(OCH$_3$)$_3$     (Compound 10)

F(CF$_2$)$_6$—CH$_2$CH$_2$—Si(OCH$_2$CH$_3$)$_3$     (Compound 11)

F(CF$_2$)$_8$—CH$_2$CH$_2$—Si(OCH$_2$CH$_3$)$_3$     (Compound 12)

Among the compounds, the compounds 1 to 8 are prepared by, for example, the following methods. The compounds 9 to 12 are sold by Hydrus Chemical Inc. in the names of "1H, 1H, 2H, 2H-perfluorooctyltrimethoxysilane" (compound 9), "1H, 1H, 2H, 2H-perfluorooctyltriethoxysilane" (compound 10), "1H, 1H, 2H, 2H-perfluorodecyltrimethoxysilane" (compound 11), and "1H, 1H, 2H,2H-perfluorodecyltriethoxysilane" (compound 12), respectively. Other materials are sold by Daikin Industries under the name of Optool DSX.

(Synthesis of Compound 1)

25 Parts by weight of Krytox® 157FS-L (average molecular weight 2500) manufactured by duPont was dissolved in 100 parts by weight of PF-5080 manufactured by 3M. 20 Parts by weight of thionyl chloride was added to the solution under stirring to circulate it for 48 hours. Thionyl chloride and PF-5080 wee evaporated with an evaporator to produce 25 parts by weight of an acid chloride of Krystox 157FS-L.

To the resulting product were added 100 parts by weight of PF-5080, 3 parts by weight of Sila Ace S330 manufactured by Chisso Corp. and 3 parts by weight of thriethyl amine. Thereafter, the reaction solution was filtered with Radiolite Fine Flow-A manufactured by Showa Chemical Industries to obtain a filtered solution. PF-080 in the solution was evaporated to obtain 20 parts by weight of compound 1.

(Synthesis of Compound 2)

The above process for compound 1 was conducted to produce 20 parts by weight of compound 2, except that 3 Parts by weight of Sila Ace S360 was used instead of Sila Ace S330.

(Synthesis of Compound 3)

The above process for compound 1 was conducted to produce 30 parts by weight of compound 3, except that 35 Parts by weight of Demnum SH (average molecular weight: 3500) manufactured by Daikin Industries was used instead of Krytox 157-L.

(Synthesis of Compound 4)

The above process for compound 1 was conducted to produce 30 parts by weight of compound 4, except that 3 parts by weight of Sila Ace S360 used instead of Sila Ace S330 and 35 parts by weight of Demnum SH (average molecular weight: 3500) manufactured by Daikin Industries was used instead of Krytox 157-L, and.

(Synthesis of Compound 5)

The above process for compound 1 was conducted to produce 3.5 parts by weight of compound 5, except that 3.5 parts by weight of 7H-dodecafluoroheptanoic acid (average molecular weight: 346.06) manufactured by Daikin Industries was used instead of Krytox 157-L.

(Synthesis of Compound 6)

The above process for compound 1 was conducted to produce 3.5 parts by weight of compound 6, except that 3 parts by weight of 7H-dodecafluoroheptanoic acid (average molecular weight: 346.06) was used instead of Krytox FS-L and 2 parts by weight of Sila Ace S 320 manufactured by Daikin Industries was used instead of Sila Ace S330.

(Synthesis of Compound 7)

The above process for compound 1 was conducted to produce 4.5 parts by weight of compound 7, except that 4.5 parts by weight of 9H-hexadecafluorononaic acid (average molecular weight: 346.06) manufactured by Daikin Industries was used instead of Krytox 157-L.

(Synthesis of Compound 8)

The above process for compound 1 was conducted to produce 4.5 parts by weight of compound 8, except that 4.5 parts by weight of 7H-dodecafluoroheptanoic acid (average molecular weight: 446.07) was used instead of Krytox FS-L and 2 parts by weight of Sila Ace S 320 manufactured by Chisso Corp. instead of Sila Ace S330.

Methods of manufacturing the cathode catalyst layer containing the silicon compounds or methods of manufacturing the MEA are exemplified as follows.

(1) The MEA is directly treated.

(2) After the catalyst is treated, the treated catalyst is used to manufacture the MEA.

In the following, the method (1) is explained. At first, the cathode catalyst surface of MEA is irradiated with oxygen plasma to introduce hydroxyl groups (OH). An output of high frequency power source is preferably 50 to 200 W and irradiation time is preferably 30 to 300 seconds. It is possible to control a concentration of hydroxyl groups by adjusting the output and the time.

On the other hand, a solution of the silicon compound dissolved in a fluorine-containing solvent is prepared. As a solvent, there are FC-72, FC-77, PF-5060, HFE-7100, HFE-7200, manufactured by 3M and Vertrel XF®, manufactured by duPont. A concentration of the silicon compound is preferably 0.5% by weight.

The treated cathode catalyst of MEA is immersed in the silicon compound solution for about 5 minutes. After the immersed cathode catalyst is lifted up from the solution, it is heated to react the hydroxyl groups on the surface of the cathode and the silicon compound represented by formula (1). A heating time is preferably 100° C. or higher; the reaction takes place quickly at a temperature of 120° C. or higher. A heating time is preferably 1 hour at 100° C., or 15 minutes at 120° C. A heating temperature of 250° C. is not preferable because the silicon compounds and the polymer electrolyte may be decomposed. After the heat treatment, the resulting cathode catalyst is cleaned with the fluorine-containing solvent.

The solution containing the silicon compound represented by the formulae (1) is coated on the cathode catalyst, followed by heating it to obtain the cathode catalyst layer containing the silicon compound of MEA. Coating of the solution is conducted by a brush coating, spinning coating, spray coating, etc.

Since the fluorine-containing silicon compounds react with hydroxyl groups on the surface of the catalyst to form chemical bonds, they are never separated.

Another method of manufacturing the MEA that contains the fluorine compound includes treating the catalyst with plasma, forming chemical bonds of the fluorine-containing compound and hydroxyl groups and assembling the MEA using the treated cathode catalyst. This method will be explained in the following.

At first, carbon carrying a metallic catalyst is irradiated with oxygen plasma to introduce hydroxyl groups on the surface of the metallic catalyst. An output of the high frequency power source is preferably 50 to 200 W and the irradiation time is preferably 30 to 300 seconds. By adjusting the output and irradiation time, the concentration of the hydroxyl groups is controlled.

On the other hand, a solution of the fluorine-containing silicon compound is prepared. As a fluorine-series solvent, there are FC-72, FC-77, PF-5060, PF5080, HPE-7100, HPE7200 and Vertrel XF, etc. A concentration of the silicon compound is preferably 0.5% by weight. The treated catalyst is immersed in the solution for about 5 minutes. After taking out the catalyst from the solution, it is heated to effect the reaction between the hydroxyl groups and the silicon compound.

A heating temperature is preferably 100° C. or higher, if it is higher than 120° C., the reaction takes place very fast. A heating time is preferably about 1 hour at 100° C., or about 15 minutes at 120° C., about ten minutes at 140° C. A heating temperature above 250° C. is not preferable, because the fluorine-containing compound is decomposed at such high temperatures.

The resulting catalyst is cleaned with the fluorine-series solvent to remove an excess compound to produce the carbon carrying metallic catalyst with the fluorine-containing silicon compound.

Then MEA is prepared using the carbon catalyst containing at least one of the fluorine-containing silicon compound.

In preparing the MEA, the following process may be employed. At first, a cathode catalyst paste and an anode catalyst paste are prepared by thoroughly mixing the treated carbon carrying the metallic catalyst, a solid polymer electrolyte and a solvent for dissolving the solid polymer electrolyte. The pastes are coated on separation films made of PTFE by a spray dry method, etc. Then, the coatings are dried at 80° C. by removing the solvent to produce a cathode catalyst layer and an anode catalyst layer.

The anode catalyst layer and the cathode catalyst layer are imposed on the solid polymer electrolyte membrane, and bonded by hot press. By peeling off the separating films, a desired MEA is obtained.

As one example for manufacturing the MEA, a cathode catalyst paste containing the treated carbon carrying Pt, the solid electrolyte and a solvent for dissolving the electrolyte and an anode paste containing the treated carbon carrying PtRu, a solid polymer electrolyte and the solvent are coated on the solid polymer electrolyte membrane by a spray dry method.

The solid polymer electrolytes used as the electrolyte membrane 21 and the component contained in the catalyst layers are ones that exhibit proton conduction property. There are sulfonated or alkylene-sulfonated fluorine-containing polymers such as perfluorocarbon-series sulufonate resins, polyperfluorostyrene-series sulfonated resins. Other examples are polysulfone resins, polyether sulfone resins, polyetherethersulfone resins, polyetherether keton resins, sulfonated hydrocarbon series polymers. Composite solid polymer electrolytes are used wherein proton conduction inorganic compounds such as hydrated tungsten oxide, hydrated zirconium oxide, hydrated tin oxide, tungstate silicide, molybdate silicide, molybdo-phosphate, etc are dispersed in a heat resisting resin.

On the other hand, the metallic catalyst 24 used in the present invention are Pt for at least the cathode and a Pt alloy containing Ru for at least the anode. The present invention does not limit the metallic catalysts to the above-mentioned elements. Further, the noble metals may contain a third element such as iron, tin, rare earth elements for improving the stability of the catalysts.

In the following, the present invention will be explained in detail by reference to examples. The scope of the present invention will not be limited to the following examples.

Example 1

A solution containing carbon black carrying Pt in an amount of 50% by weight, a 5% by weight Nafion (registered trade mark) solution manufactured by Aldrich, and fluorinated graphite were mixed to prepare cathode catalyst pastes wherein a weight ratio of the catalyst to Nafion was 72% by weight. A ratio of the catalyst to Nafion was 4 to 1.

On the other hand, an anode catalyst layer was manufactured by the following manner. An electrode catalyst consisting of carbon black carrying a Pt—Ru alloy of which an atomic ratio is 1:1 in an amount of 50% by weight, and a Nafion solution were mixed at a weight % of 72.5 and 27.5 to prepare an anode catalyst paste.

The cathode catalyst paste and the anode catalyst paste were separately coated on both sides of PTFE sheet by an applicator method and the coatings were dried to prepare a cathode catalyst layer and an anode catalyst layer. An amount of Pt in the cathode catalyst layer was 1.0 mg/cm$^2$ and an amount of PtRu was 1.0 mg/cm$^2$.

A Nafion electrolyte membrane (Nafion 112, a thickness: 50 μm) was sandwiched between the cathode catalyst layer and the anode catalyst layer and the catalyst layers were transferred from the PTFE sheet by a hot-press to obtain a MEA. A hot-press temperature was 160° C. and a hot-press pressure was 80 kg/cm$^2$.

The surface of the cathode catalyst layer was irradiated with oxygen plasma. An apparatus for oxygen plasma irradiation was PDC210 manufactured by Yamato Glass Inc. A pressure in a chamber before introduction of oxygen was less than 0.1 Torr, and a pressure after oxygen introduction was 0.5 Torr. An output of a high frequency power source was 100 W, and a plasma irradiation time was 150 seconds.

On the other hand, a solution of fluorine-containing silicon compound was prepared by dissolving the compound in a fluorine-series solvent Florinert PF-5080 manufactured by 3M. A concentration of the solution was 0.5% by weight. The plasma treated MEA was immersed for 5 minutes and lifted up. Then, the assembly was heated at 120° C. for 15 minutes. Thereafter, the assembly was cleaned by spraying Florinert PF-5080 on the assembly to remove excess compound.

A contact angle of the cathode catalyst layer was measured by a contact angle meter. The contact angle was 160 degrees, which exhibits a super-water-repellency.

I-V characteristics of the MEA were measured. A testing cell is shown in FIG. 1. Air was supplied to the cathode catalyst side by breathing. A methanol aqueous solution was supplied to the anode catalyst side at a rate of 10 mL/min. A concentration of the methanol aqueous solution was 10% by weight. I-V characteristics of the cell were tested at 25° C.

Comparative Example 1

Figure 4:
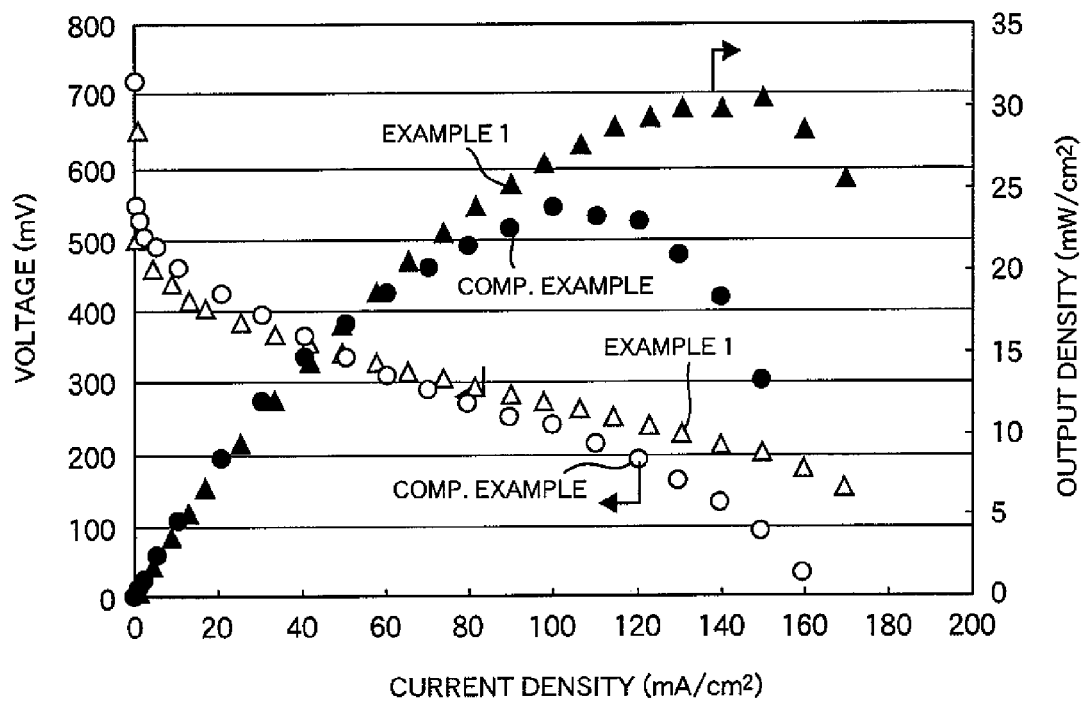
FIG. 4 is a graph showing the advantages of the MEA according to the present invention.

An MEA for comparison was manufactured by the similar method of example 1, except that the cathode catalyst was not treated with the plasma and the fluorine-containing silicon compound. A contact angle of the cathode catalyst surface was measured by the contact angle meter. The contact angle was 120° C. FIG. 4 shows I-V characteristics of the MEAs of the example 1 and the comparative example 1. The assembly of the example 1 exhibited a higher voltage at a high current density operation, compared with that of the comparative example 1. This means that since the water repellency of the cathode of the example 1 was remarkably improved, flooding phenomenon was prevented.

Example 2

The MEA was manufactured in the similar manner as in the example 1. I-V characteristics of the cathode were tested where plasma irradiation time was changed.

The irradiation time were 30, 60, 100, 150, 200 and 300 seconds. Other conditions were the same as in example 1. Conditions of testing I-V characteristics were the same as in example 1.

Table 1 shows contact angles with water and voltages at current density of 150 mA/cm² with respect to plasma irradiation time. When the plasma irradiation time becomes as longer as 30, 60 and 100 seconds, the contact angle with water becomes larger. The super-water-repellency was observed when the irradiation time was 150 seconds. A voltage at a current density of 150 mA/cm² increased in proportion to the contact angle with water. When the plasma irradiation time was 150 seconds or more, the voltage at the current density of 150 mA/cm² was almost the same.

TABLE 1

|  | Comparative example 1 (no-treatment) | Plasma irradiation time (second) | | | | | |
| --- | --- | --- | --- | --- | --- | --- | --- |
|  |  | 30 | 60 | 100 | 150 | 200 | 300 |
| Contact angle with water (degrees) | 120 | 136 | 139 | 145 | 160 | 163 | 161 |
| Voltage (mV) at current density of 150 mA/cm² | 88 | 160 | 163 | 185 | 202 | 208 | 205 |

Example 3

The MEA was manufactured in accordance with the similar manner as in example 1. Water repellency and I-V characteristics of the assembly were tested where output of the high frequency power source of the oxygen plasma apparatus was varied. The outputs were 50, 100, 150 and 200 W. Other conditions were the same as in example 1. The measuring conditions were the same as in example 1.

Table 2 shows contact angles with water and voltages of the cell at a current density of 150 mA/cm² with respect to outputs of a high frequency power source of the oxygen plasma apparatus. When the output was 100 W or more, the super-water-repellency was observed. Voltages at a current density of 150 mA/cm² or more were almost the same.

TABLE 2

|  | Output of a power source of a plasma apparatus (W) | | | |
| --- | --- | --- | --- | --- |
|  | 50 | 100 | 150 | 200 |
| Contact angle with water (degrees) | 141 | 160 | 158 | 162 |
| Voltage at a current density of 150 mA/cm² (mV) | 165 | 202 | 198 | 195 |

Example 4

The MEA was manufactured by the similar manner as in example 1. The similar treatment was conducted except that the cathode catalyst layer was treated with a 0.3 weight % solution of compound 2 in PF-5080 was used instead of a 0.3 weight % solution of compound 1 in PF-5080. The I-V characteristics were tested in the similar manner as in example 1.

The contact angle with water was 162 degrees. A voltage at a current density of 150 mA/cm² was 195 mV.

Example 5

The MEA was manufactured by the similar manner as in example 1. The similar treatment was conducted except that the cathode catalyst layer was treated with a 0.3 weight % solution of compound 3 in PF-5080 was used instead of a 0.3 weight % solution of compound 1 in PF-5080. The I-V characteristics were tested in the similar manner as in example 1.

The contact angle with water was 166 degrees. A voltage at a current density of 150 mA/cm² was 203 mV.

Example 6

The MEA was manufactured by the similar manner as in example 1. The similar treatment was conducted except that the cathode catalyst layer was treated with a 0.3 weight % solution of compound 4 in PF-5080 was used instead of a 0.3 weight % solution of compound 1 in PF-5080. The I-V characteristics were tested in the similar manner as in example 1.

The contact angle with water was 165 degrees. A voltage at a current density of 150 mA/cm² was 203 mV.

Example 7

The MEA was manufactured by the similar manner as in example 1. The similar treatment was conducted except that the cathode catalyst layer was treated with a 0.3 weight % solution of compound 5 in PF-5080 was used instead of a 0.3 weight % solution of compound 1 in PF-5080. The I-V characteristics were tested in the similar manner as in example 1.

The contact angle with water was 156 degrees. A voltage at a current density of 150 mA/cm² was 193 mV.

Example 8

The MEA was manufactured by the similar manner as in example 1. The similar treatment was conducted except that the cathode catalyst layer was treated with a 0.3 weight % solution of compound 6 in PF-5080 was used instead of a 0.3 weight % solution of compound 1 in PF-5080. The I-V characteristics were tested in the similar manner as in example 1.

The contact angle with water was 156 degrees. A voltage at a current density of 150 mA/cm$^2$ was 196 mV.

Example 9

The MEA was manufactured by the similar manner as in example 1. The similar treatment was conducted except that the cathode catalyst layer was treated with a 0.3 weight % solution of compound 7 in PF-5080 was used instead of a 0.3 weight % solution of compound 1 in PF-5080. The I-V characteristics were tested in the similar manner as in example 1.

The contact angle with water was 157 degrees. A voltage at a current density of 150 mA/cm$^2$ was 198 mV.

Example 10

The MEA was manufactured by the similar manner as in example 1. The similar treatment was conducted except that the cathode catalyst layer was treated with a 0.3 weight % solution of compound 8 in PF-5080 was used instead of a 0.3 weight % solution of compound 1 in PF-5080. The I-V characteristics were tested in the similar manner as in example 1.

The contact angle with water was 157 degrees. A voltage at a current density of 150 mA/cm$^2$ was 197 mV.

Example 11

The MEA was manufactured by the similar manner as in example 1. The similar treatment was conducted except that the cathode catalyst layer was treated with a 0.3 weight % solution of compound 9 in PF-5080 was used instead of a 0.3 weight % solution of compound 1 in PF-5080. The I-V characteristics were tested in the similar manner as in example 1.

The contact angle with water was 158 degrees. A voltage at a current density of 150 mA/cm$^2$ was 200 mV.

Example 12

The MEA was manufactured by the similar manner as in example 1. The similar treatment was conducted except that the cathode catalyst layer was treated with a 0.3 weight % solution of compound 10 in PF-5080 was used instead of a 0.3 weight % solution of compound 1 in PF-5080. The I-V characteristics were tested in the similar manner as in example 1.

The contact angle with water was 159 degrees. A voltage at a current density of 150 mA/cm$^2$ was 203 mV.

Example 13

The MEA was manufactured by the similar manner as in example 1. The similar treatment was conducted except that the cathode catalyst layer was treated with a 0.3 weight % solution of compound 11 in PF-5080 was used instead of a 0.3 weight % solution of compound 1 in PF-5080. The I-V characteristics were tested in the similar manner as in example 1.

The contact angle with water was 158 degrees. A voltage at a current density of 150 mA/cm$^2$ was 201 mV.

Example 14

The MEA was manufactured by the similar manner as in example 1. The similar treatment was conducted except that the cathode catalyst layer was treated with a 0.3 weight % solution of compound 12 in PF-5080 was used instead of a 0.3 weight % solution of compound 1 in PF-5080. The I-V characteristics were tested in the similar manner as in example 1.

The contact angle with water was 159 degrees. A voltage at a current density of 150 mA/cm$^2$ was 200 mV.

Example 15

Electrode catalyst comprising carbon black carrying Pt in an amount of 50% by weight was subjected to oxygen plasma treatment. The oxygen plasma irradiation apparatus was a plasma apparatus PDC210, manufactured by Yamato Glass Inc. A pressure in a chamber before introduction of oxygen was 0.1 Torr, and a pressure after introduction of oxygen was 0.5 Torr. An output of a high frequency power source was 100 W, and a plasma irradiation time was 150 seconds.

On the other hand, a solution of compound 1 was prepared by dissolving it in Florinert PF-5080 manufactured by 3M. A concentration of the compound 1 was 0.5% by weight. The above mentioned electrode catalyst was immersed in the solution for 5 minutes. After the catalyst was picked up, it was heated at 120° C. for 15 minutes. Then, the catalyst was cleaned with Florinert PF-5080 to remove excess compound 1.

This catalyst was used to manufacture a MEA. A cathode catalyst paste comprising a mixture of a Nafion solution (Nafion concentration: 5 weight %, manufactured by Aldrich Corp.) was prepared wherein the weight % s of the electrode catalyst and Nafion were 80 and 20, respectively. The ratio of the catalyst to Nafion was 4 to 1.

On the other hand, an anode catalyst layer was prepared in the following manner. An anode catalyst paste of a mixture of an electrode catalyst comprising carbon black carrying PtRu alloy in an atomic ratio of 1 to 1 and a Nafion solution (Nafion concentration: 5 weight %, manufactured by Aldrich Corp.) was prepared wherein weight % s of the electrode catalyst and Nafion solution were 72.5 and 27.5, respectively. The cathode catalyst paste and the anode catalyst paste were separately coated on both faces of PTFE sheet by an applicator method. The coatings were dried to remove the solvent. The resulting cathode catalyst layer and the anode catalyst layer contained Pt in an amount of 1.0 mg/cm$^2$ and PtRu in an amount of 1.0 mg/cm$^2$, respectively.

Nafion membrane (Nafion 112, thickness: 50 μm) was sandwiched between the cathode catalyst layer and the anode catalyst layer, and the laminate was hot-pressed at 160° C. at a pressure of 80 kg/cm$^2$ to manufacture the MEA.

A contact angle with water of the resulting cathode catalyst layer of the MEA was measured by a contact angle meter. The contact angle was 168 degrees, which amounts to the super-water-repellency. I-V characteristics of the MEA were tested. Measurement conditions were the same as in example 1. A voltage at a current density of 150 mA/cm$^2$ was 165 mV, which is higher than the non-treated cathode catalyst layer of comparative example 1.

What is claimed is:

1. A membrane-electrode assembly comprising a cathode catalyst layer for reducing an oxidant gas, a polymer electrolyte membrane and an anode catalyst layer, the polymer electrolyte membrane being sandwiched between the cathode catalyst layer and the anode catalyst layer, wherein the cathode catalyst layer exhibits super-water-repellency, and wherein the cathode catalyst layer has a portion with at least one member selected from the group consisting of silicon compounds having perfluoropolyether chains represented by:

$F\{CF(CF_3)\text{—}CF_2O\}_n\text{—}CF(CF_3)\text{—}CONH\text{—}(CH_2)_3\text{—}Si(OCH_2CH_3)_3$, $F\{CF(CF_3)\text{—}CF_2O\}_n\text{—}CF(CF_3)\text{—}CONH\text{—}(CH_2)_3\text{—}Si(OCH_3)_3$, $F\{CF(CF_2CF_2O)_n\text{—}CF_2CF_2\text{—}CONH\text{—}(CH_2)_3\text{—}Si(OCH_2CH_3)_3$, and $F(CF_2CF_2CF_2O)_n\text{—}CF_2CF_2\text{—}CONH\text{—}(CH_2)_3\text{—}Si(OCH_3)_3$.

2. The membrane-electrode assembly according to claim 1, wherein the silicon compounds are present in the vicinity of the surface of the cathode catalyst layer.

3. A fuel cell comprising at least one unit cell the electrode-membrane assembly defined in claim 1, a pair of gas diffusion layers each in contact with the cathode catalyst layer and the anode catalyst layer, and a pair of separator each in contact with the gas diffusion layers.

4. A fuel cell according to claim 3, wherein the fuel is methanol aqueous solution.

5. The fuel cell according to claim 3, wherein the fuel is hydrogen, which is supplied from a hydrogen storage-supply system that performs hydrogenation reaction by a hydrogen storage of an aromatic compound and de-hydrogenation reaction of a hydrogen storage material of hydrogenated derivatives of the aromatic compound.

* * * * *